United States Patent
Sputz et al.

(10) Patent No.: US 9,420,008 B1
(45) Date of Patent: Aug. 16, 2016

(54) METHOD FOR REPURPOSING OF COMMUNICATIONS CRYPTOGRAPHIC CAPABILITIES

(71) Applicant: BAE Systems Information and Electronic Systems Integration Inc., Nashua, NH (US)

(72) Inventors: Sharon K. Sputz, Teaneck, NJ (US); David M. Cooper, New York, NY (US); Matthew J. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 626 days.

(21) Appl. No.: 13/800,353

(22) Filed: Mar. 13, 2013

Related U.S. Application Data

(60) Provisional application No. 61/645,169, filed on May 10, 2012.

(51) Int. Cl.
*H04L 29/06* (2006.01)
*H04L 9/06* (2006.01)

(52) U.S. Cl.
CPC ............. *H04L 63/30* (2013.01); *H04L 9/0618* (2013.01)

(58) Field of Classification Search
CPC ........... H04L 9/0618; H04L 9/10; H04L 9/12; H04L 63/18; H04L 63/30; F41H 13/0093; F41H 11/12; F41H 13/00; H04K 2203/24
See application file for complete search history.

(56) References Cited

U.S. PATENT DOCUMENTS

| | | | | |
|---|---|---|---|---|
| 5,767,802 A * | 6/1998 | Kosowsky | .......... | G01S 13/9023 342/25 C |
| 6,072,994 A * | 6/2000 | Phillips | ................ | G01S 13/767 375/219 |
| 6,119,234 A * | 9/2000 | Aziz | ....................... | H04L 29/06 726/11 |
| 6,212,280 B1 * | 4/2001 | Howard, Jr. | ........... | G06F 21/602 380/279 |
| 6,263,437 B1 * | 7/2001 | Liao | ........................ | H04L 9/084 380/283 |
| 6,754,821 B1 * | 6/2004 | Berson | .................. | G06F 21/335 713/170 |
| 7,296,503 B1 * | 11/2007 | McGrath | ................. | F41H 11/32 102/402 |
| 8,203,478 B1 * | 6/2012 | Huneycutt | ............... | H04K 3/28 342/14 |
| 2002/0107804 A1 * | 8/2002 | Kravitz | .................... | G06F 21/10 705/51 |
| 2002/0131601 A1 * | 9/2002 | Ninomiya | ............. | H04L 9/0822 380/277 |
| 2003/0084309 A1 * | 5/2003 | Kohn | ..................... | G06F 1/3203 713/189 |
| 2003/0161472 A1 * | 8/2003 | Tong | ...................... | H04L 9/302 380/270 |

(Continued)

*Primary Examiner* — Joseph P Hirl
*Assistant Examiner* — J. Brant Murphy
(74) *Attorney, Agent, or Firm* — Sand & Sebolt, LPA; Daniel J. Long

(57) ABSTRACT

A system and method for repurposing of cryptographic capabilities in an electronic warfare (EW) environment is presented. A method begins by determining in a client system a cryptographic function to be performed; however, the client system does not have any cryptographic functionality. The client system then requests the cryptographic function be performed in a cryptographic logic that is physically secured with the client system and is external to the client system. The cryptographic logic performs the cryptographic function to produce a cryptographic result. The cryptographic result is then provided to the client system.

15 Claims, 4 Drawing Sheets

(56) References Cited

U.S. PATENT DOCUMENTS

| | | | | |
|---|---|---|---|---|
| 2006/0060074 A1* | 3/2006 | Ham | ......................... | H04K 3/42 |
| | | | | 89/1.11 |
| 2007/0232304 A1* | 10/2007 | Goldman | ................... | F42D 5/04 |
| | | | | 455/435.1 |
| 2008/0022085 A1* | 1/2008 | Hiltgen | ................. | H04L 63/068 |
| | | | | 713/155 |
| 2008/0083320 A1* | 4/2008 | Chang | ..................... | F41H 11/16 |
| | | | | 89/1.13 |
| 2009/0288550 A1* | 11/2009 | Willner | ................... | F41H 11/16 |
| | | | | 86/50 |
| 2009/0310530 A1* | 12/2009 | Cerra, II | ............ | H04B 7/18508 |
| | | | | 370/316 |
| 2010/0068988 A1* | 3/2010 | Valentine | ................. | H04K 3/42 |
| | | | | 455/1 |
| 2010/0074160 A1* | 3/2010 | Mason | ................. | B61L 15/0027 |
| | | | | 370/315 |
| 2010/0087218 A1* | 4/2010 | Hannosh | ................ | H04M 9/082 |
| | | | | 455/518 |
| 2010/0170383 A1* | 7/2010 | Willner | ................... | F41H 11/16 |
| | | | | 86/50 |
| 2010/0282052 A1* | 11/2010 | Ham | ........................ | H04K 3/42 |
| | | | | 89/1.11 |
| 2011/0087879 A1* | 4/2011 | Chand | ..................... | H04K 3/25 |
| | | | | 713/153 |
| 2011/0268199 A1* | 11/2011 | O'Hara | ................... | H04L 1/004 |
| | | | | 375/259 |
| 2011/0304494 A1* | 12/2011 | Janusas | .................... | H04K 3/43 |
| | | | | 342/14 |
| 2013/0054995 A1* | 2/2013 | Dove | ................ | H04L 12/40032 |
| | | | | 713/323 |

\* cited by examiner

METHOD FOR REPURPOSING OF COMMUNICATIONS CRYPTOGRAPHIC CAPABILITIES

CROSS REFERENCE TO RELATED APPLICATION

This application claims priority from U.S. Provisional Application Ser. No. 61/645,169, filed May 10, 2012; the disclosure of which is incorporated herein by reference.

BACKGROUND OF THE INVENTION

1. Field of Invention

The current invention relates generally to apparatus, systems and methods for securing data. More particularly, the apparatus, systems and methods relate to securing data in an electronic warfare (EW) environment. Specifically, the apparatus, systems and methods provide cryptographic services to systems that do not have cryptographic services in an EW environment.

2. Description of Related Art

Many systems such as those that participate in electronic warfare (EW) or identification of friend or foe (IFF) may need to encrypt and/or decrypt data. Alternatively they may require initialization vectors (IVs) used to begin encrypting data or for the generation of secure keys. Alternatively some EW systems may require other secure data. For example, a time to switch communication frequencies so that an enemy cannot intercept EW communications. Generation of these types of data requires each EW device to have the capability to generate cryptographic functions. The costs of embedding cryptographic devices in those devices may be prohibitive, or their architecture may not be supportive of such secure cryptographic devices. What is needed is a better way to generate cryptographic functions in devices in an EW environment.

SUMMARY

According to the preferred embodiment, many communication (Comms) systems have embedded cryptographic devices and can be directly interfaced with other systems on a platform such as those used in an electronic warfare (EW) environment that may need to identify friend or foe (IFF). By exposing an interface to those embedded cryptographic devices (i.e. offering a set of "cryptographic services") it becomes possible for external systems (EW, IFF etc.) to perform functions requiring cryptographic services without having embedded cryptographic capability in every device. An example would be a ground mobile radio (GMR) or similar radio encrypting/decrypting information for a Counter Radio Controlled Improvised Explosive Device Electronic Warfare (CREW) system or Joint CREW (JCREW) system so that it can transmit encrypted data as embedded data in an EW environment. This invention can also be used to provide "reception security" to randomize the location of EW quiet periods.

One configuration of the preferred embodiment is a method for repurposing of cryptographic capabilities in an electronic warfare (EW) environment. The method begins by determining in a client system a cryptographic function that needs to be performed; however, the client system does not have any cryptographic functionality. The client system may, for example, be a CREW system used to deactivate improvised explosive devices (IEDs). The client system then requests the cryptographic function be performed in a cryptographic logic that is physically secured with the client system and is external to the client system. The cryptographic logic may, for example, be located in a GMR system. The cryptographic logic performs the cryptographic function to produce a cryptographic result. The cryptographic result is then provided to the client system.

In another configuration of the method, the client system is a first client system, the cryptographic logic is a first cryptographic logic, the cryptographic function is a first cryptographic function and the cryptographic result is a first cryptographic result. The method transmits the first cryptographic result from the first client system to a second client system. The second clients system then requests that a second cryptographic function be performed in a second cryptographic logic. The second cryptograph logic may be physically secured with the second client system and may be external to the second client system. The second cryptographic function is performed in the second cryptographic logic to produce a second cryptographic result. The second cryptographic result is then provided to the second client system.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
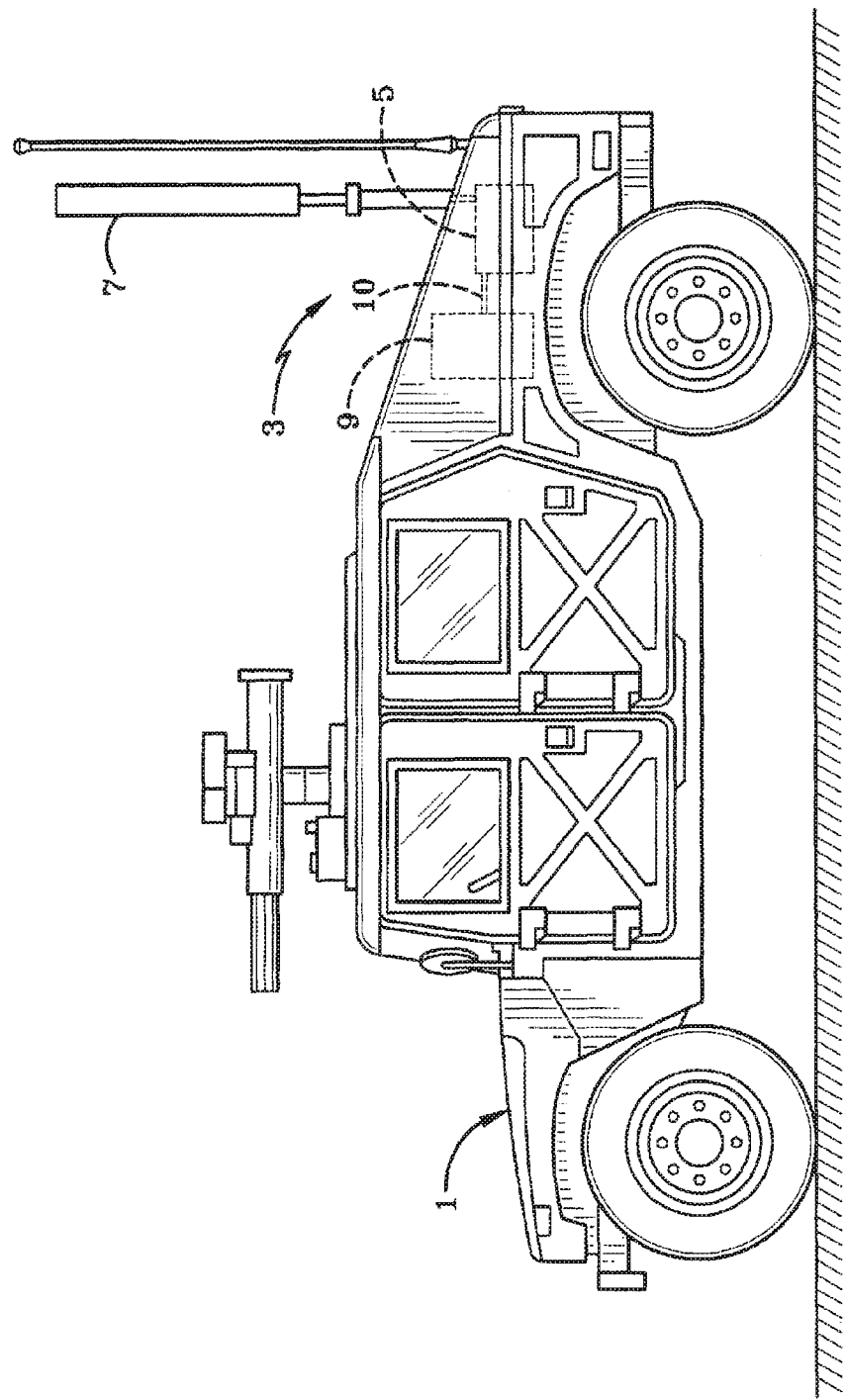
FIG. 1 illustrates an electronic warfare (EW) environment in which repurposing of cryptographic capabilities is useful.

As mentioned above, devices used in an electronic warfare (EW) type of environment may need cryptographic capabilities but it can be cost prohibitive to implement that capability separately in each device. For example, FIG. 1 illustrates an example vehicle 1 used in an EW battlefield. The vehicle illustrated is a Humvee but it could be a different vehicle or any other device that requires cryptographic capability. For example, the vehicle in FIG. 1 can be outfitted with a Counter Radio Controlled Improvised Explosive Device Electronic Warfare (CREW) system 3. The CREW system 3 can be a joint CREW (JCREW) or a Duke type of system that is used to disable improvised explosive devices (IEDs).

The CREW system 3 has IED countermeasure logic 5 and an antenna 7 electrically connected to the IED countermeasure logic 5. The IED countermeasure logic 5 rapidly generates a variety of frequencies over a band of frequencies that it desires to jam and radiates them out of the antenna 7 at high power. The frequencies or band of frequencies would correspond to possible frequencies that a terrorist would use to signal to an IED that it is to detonate. The CREW system 3 should generate these jamming frequencies of sufficient power so that as the vehicle approaches the IED it is disabled at a sufficient distance away from the vehicle 1 before the vehicle 1 of FIG. 1 and any other vehicles traveling with it are too close to the IED if it were to detonate. Of course, these jamming frequencies should also be of sufficient power so that the vehicle 1 of FIG. 1 and any other vehicles traveling with it are at a sufficient distance past the IED when the CREW system 3 can no longer disable the IED.

While the CREW system 3 is primarily used in disabling IEDs, it may perform other operations. For example, it may want to send classified operational statistics or other classified data from the vehicle 1 into a wireless electronic warfare network. However, to do this it would need to be outfitted with costly encryption logic, decryption logic and other logic needed to implement the required cryptographic capability. Rather than implement this cryptographic functionality in the CREW system 3, as discussed below the preferred embodiment of the invention takes advantage of using the cryptographic capability of the communication system 9 implemented in the vehicle 1. The communication system 9 communicates with the CREW system 3 over a bus 10. The communication system 9 could be a ground mobile radio (GMR) or similar radio or another device capable of encrypting/decrypting information for a CREW or JCREW system so that it can be transmitted as encrypted embedded data in an EW environment. As discussed later, the preferred embodiment can also be used to provide "reception security" to randomize the location of EW quiet periods.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Figure 2:
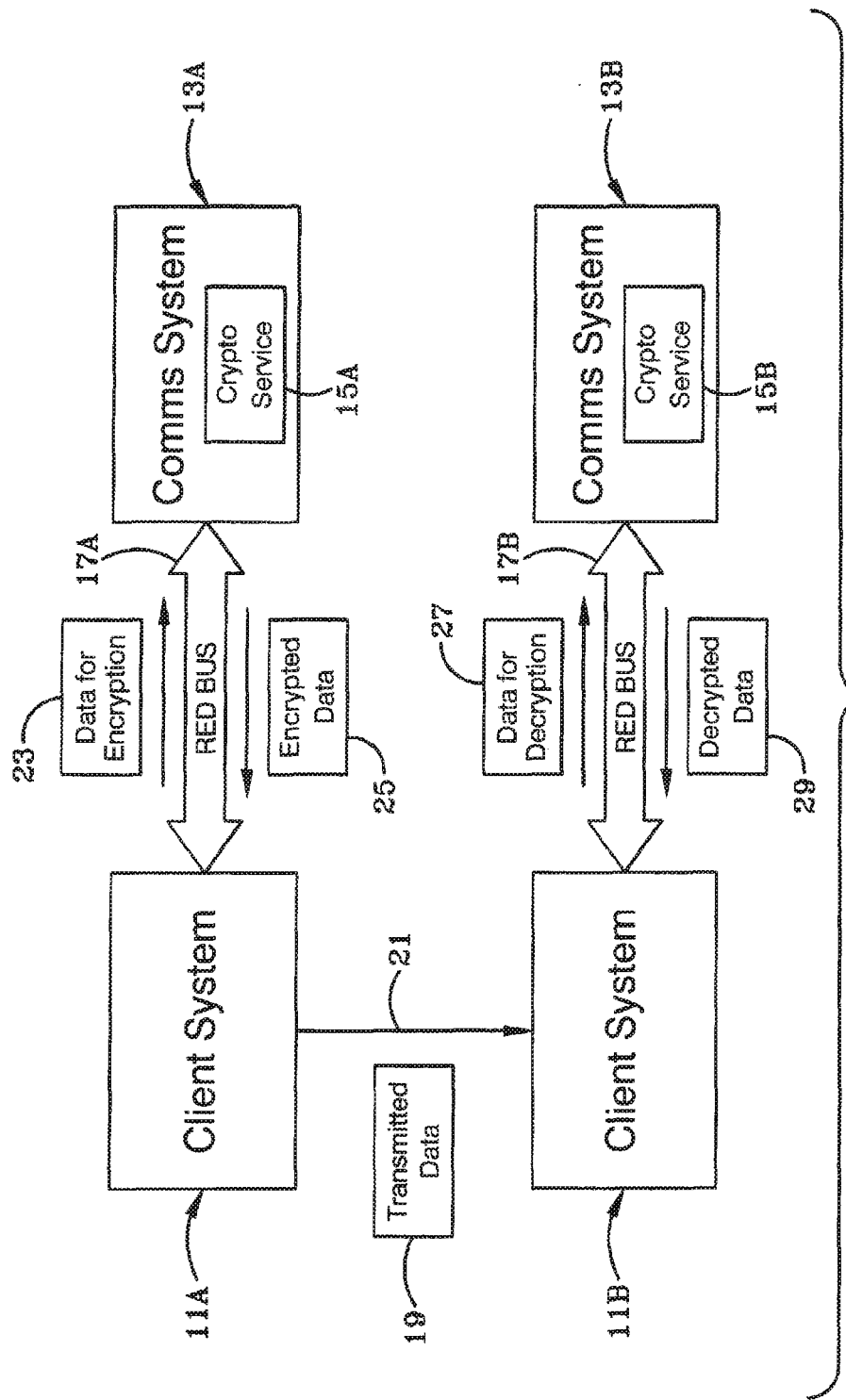
FIG. 2 illustrates an example schematic diagram of some components in an EW environment implementing the preferred embodiment of a system for repurposing of cryptographic capabilities.

FIG. 2 illustrates some of the components used in a method of repurposing cryptographic capabilities. The primary components of this figure in a first client system 11A and a second client system 11B as well as a first communication system (comms system) 13A and a second communication system 13B. The first client system 11A may be the CREW system 3 of FIG. 1 and the first communication system 13A may be a communication system 9 located in a vehicle 1.

Each communication system 13A, 13B has a corresponding cryptographic logic (crypto service) 15A, 15B. In this example figure, the first client system 11A is connected to the first communication system 13A with a first red bus 17A and the second client system 11B is connected to the second communication system 13B with a second red bus 17B. Here the term "red" bus indicates that it is a secure bus. For example, this bus may act similar to a bus 9 of FIG. 1 that allowed the CREW system 3 to communicate with the communication system 9 in the vehicle 1. The bus 9 is secure because it is interior to the vehicle 1 and not accessible by an enemy/terrorist. The first and second red busses 17A, 17B would also likely be secured inside secure structures in whatever environment they are operating.

The cryptographic logic 15A, 15B can implement a block cypher. For example, the cryptographic logic 15A, 15B can implement the data encryption standard (DES), triple DES (3DES), the advanced encryption standard (AES) or another block cypher. The AES cypher can be configured to operate using 128, 192 and/or 256 bit keys. The cryptographic logic 15A, 15B can also be configured to implement hash functions. For example, a cyclic redundancy check (CRC), a checksum, a message digest (MD), a secure hash algorithm (SHA) and/or another hash algorithm can be implemented. The cryptographic logic 15A, 15B can also generate keys, initialization vectors (IVs), generate, other random numbers and/or perform other cryptographic functions.

Having introduced the components of FIG. 2, their use and operation will now be described. As mentioned earlier, the first client system 11A may be the CREW system 3 of FIG. 1 and the first communication system 13A may be a radio system 9 located in a vehicle 1. The second client system 11B and second communication system 13B may be in an electronic device, a vehicle, another unit or some other self-contained device located separately from the first client system 11A and the first communication system 13A.

In operation, the first client system 11A may desire to send transmitted data 19 to the second client system 11B over a network link 21. However, it may be operating in an EW battlefield and the network link 21 may be a wireless link so that the data may need to be encrypted before it is transmitted. Additionally, the first client system 11A may be a CREW type of system or another type of system and may not have the ability to perform cypher operations. In that case, the first client system 11A can place the data for encryption 23 on the first secure first red bus 17A to transfer it to the first communication system 13A that has cryptograph logic 15A. The first cryptographic logic 15A then encrypts the data into encrypted data 25 and returns it to the first client system 11A over the red bus 17A. Alternatively a "black" (unsecure) interface can be used if it exists to return the encrypted data 25 to the first client system 11A because the data is encrypted and cannot be read by an unauthorized user.

The first client system 11A can now send the encrypted data 25 as the transmitted data 19 over the communication link 21 to the second client system 11B. As illustrated, the second client system 11B may also not have the ability to perform cryptographic functions. In that case, in order to decrypt the message the second client system 11B can send the received transmitted data 19 as data for decryption 27 to the second communication system 13B over the second red bus 17B between them. Alternatively a "black" (unsecure) interface can be used if it exists to send the data for decryption 27 to the second communication system 13B because the data is encrypted and cannot be read by an unauthorized user. The second communication system 13B can then decode the data for decryption 27 using its cryptographic logic 15B to produce decrypted data 29. It can then return the decrypted data 29 to the second client system 11B over the second red bus 17B. The second client system 11B can then respond to or take appropriate action based on the contents of the decrypted data 29.

Figure 3:
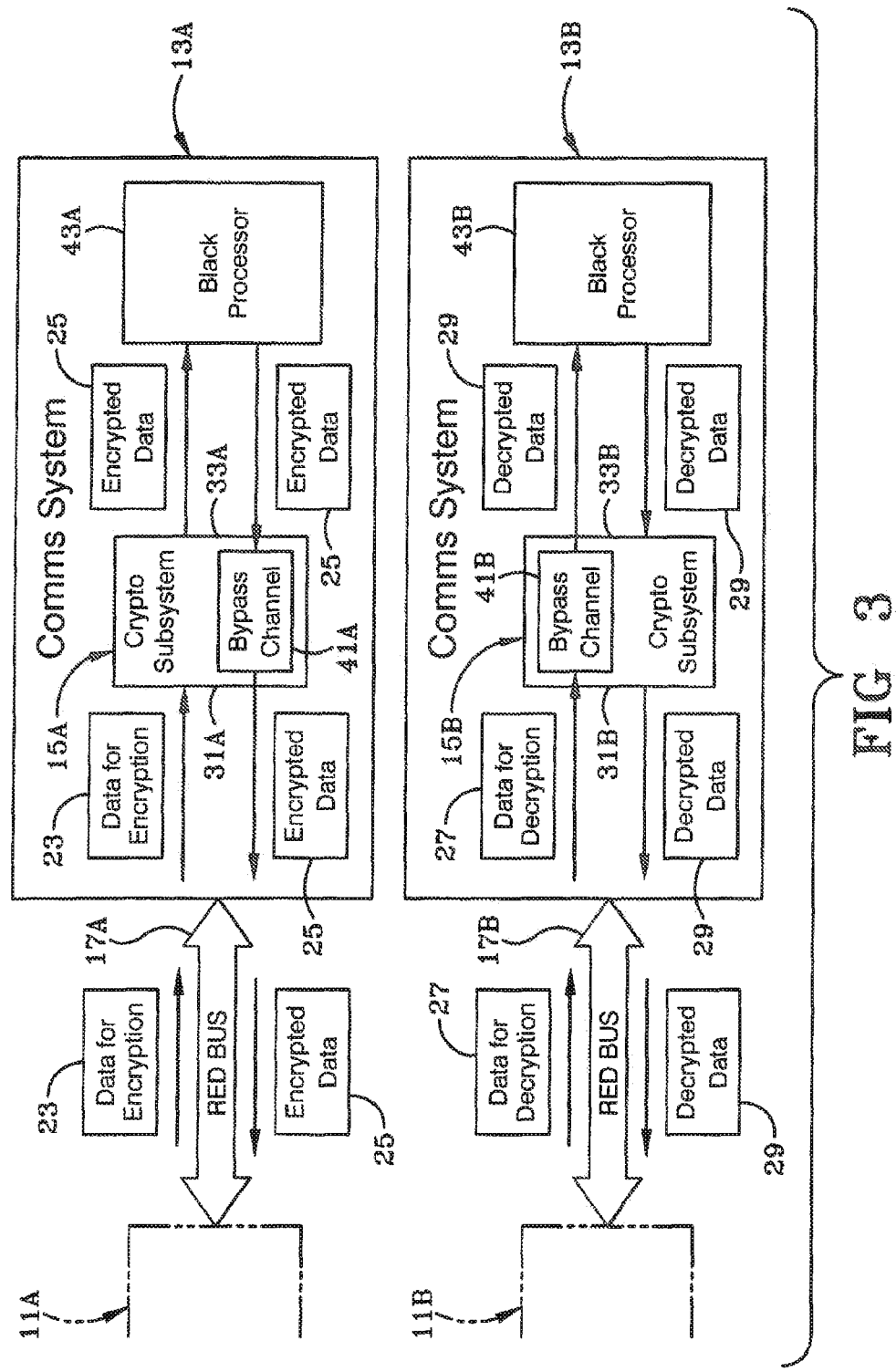
FIG. 3 illustrates another example schematic diagram of another configuration of some components in an EW environment implementing the preferred embodiment of a system for repurposing of cryptographic capabilities.

FIG. 3 illustrates the use of a bypass channel used in a method of repurposing cryptographic capabilities. Elements in FIG. 3 with the same reference number are similar to the elements of FIG. 2 with the same reference number. Many modern cryptographic systems are set up to be one-way. This means that data goes in the red sides 31A, 31B (secured side) of cryptographic logics 15A, 15B, and out the "black" (unsecured) sides 33A, 33B of the cryptographic logics 15A, 15B. In practice, modifying a cryptographic system to output data back on the red side 31A, 31B may be difficult and may require recertification of the cryptographic logic 15A, 15B and the like. An alternative approach is to feed the encrypted data 25 back and forth to the black side 33A, 33B on a "bypass channel" 41A, 41B within the cryptographic logic 15A, 15B. This alternative would generally be used for control data, and may require some level of recertification for the system but this approach may be easier. As illustrated in FIG. 3, the encrypted data exits the black side 33A of cryptographic logic 15A and a black processor 43A receives and then returns it to the black side 33A so that it can be sent over the bypass channel 41A and then on the red bus 17A and back to the client system 11A. As illustrated, the decrypted data 29 can similarly be routed over a bypass channel 41B in the second communication system 13B.

In still another alternate embodiment, the client systems 11A, 11B can request a defined number of random bits be placed on the red bus 17A, 17B. These random bits can provide an initialization vector (IV) and/or cryptographic key information and may be used for randomization or other purposes. In response to this request, the cryptographic logic 15A, 15B creates the requested bits and provides them on red bus 17A, 17B.

The block diagrams for illustrating when the cryptographic logic 15A, 15B performs other types of services are similar to those illustrated in FIGS. 2 and 3 for data encryption and decryption. In FIGS. 2 and 3, for example, "Data for Encryption" is replaced by "Random Bits" when these figures represent the cryptographic logics 15A, providing random bits. To represent the first cryptographic logic 15A generating an initialization vector (IV) "Data for Encryption" is replaced by "IV". To represent the first cryptographic logic 15A generating a cryptographic key "Data for Encryption" is replaced by "Cryptographic Key". These figures could be used to represent the first cryptographic logic 15A performing other cryptographic functions by replacing "Data for Encryption" with the name of the result of that function.

A useful example of when one of the cryptographic logics 15A, 15B would be tasked to generate random bits involves determining modulation quiet periods in EW systems. EW systems periodically need to listen to the electromagnetic radiation (ER) spectrum for potential threat systems, and thus EW systems must synchronize quiet periods so that they all are quiet at the same time. Otherwise nonstop EW transmissions make it impossible to hear potential threats. Routine/periodic static quiet periods are vulnerable to exploitation. Threats can determine when periodic static quiet periods occur and suppress their own transmissions during quiet periods to remain undetected. Additionally, threats can transmit during quiet periods to intentionally mask other threats.

Thus, the quiet periods are randomized with the use of random numbers that are broadcast to all appropriate units in a battlefield. Randomized periods are less susceptible to exploitation. Algorithms such as used in system like Link 16 Joint Tactical Information Distribution System (JTIDS) or IEEE 802.11 can be used to make use of the random numbers to randomize frequency and start times of quiet periods. "Reception security" (RECSEC) bits may be used to define quiet period locations in time and frequency. Created time domain and/or frequency domain tiling structures such as used for Link 16 or multi-frequency-time division multiple access (MF-TDMA) systems may also "hop" the center frequency of quiet areas based on a set of random bits and may also "jitter" the start of a quiet period from the TDMA slot boundaries based on other random bits. Quiet times may also overlap slot boundaries.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
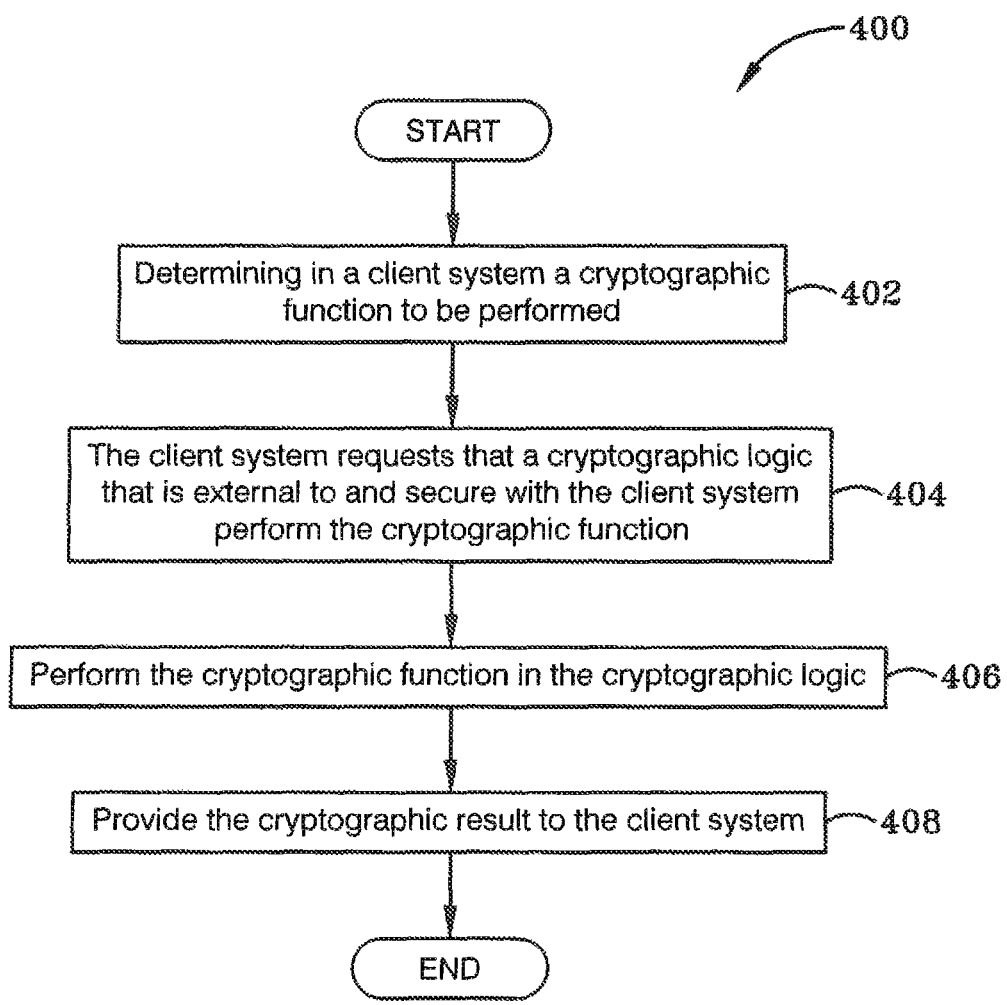
FIG. 4 illustrates an embodiment of a method for repurposing of cryptographic capabilities in an EW environment.

FIG. 4 illustrates a method 400 for repurposing of cryptographic capabilities in an electronic warfare (EW) environment. The method begins, at 402, by determining in a client system a cryptographic function to be performed; however, the client system does not have any cryptographic functionality. The client system then requests, at 404, the cryptographic function be performed in a cryptographic logic that is physically secured with the client system but is external to the client system. The cryptographic logic performs the cryptographic function, at 406, to produce a cryptographic result. The cryptographic result is then provided to the client system, at 408.

In another configuration of the method, the client system is a first client system, the cryptographic logic is a first cryptographic logic, the cryptographic function is a first cryptographic function and the cryptographic result is a first cryptographic result. The method transmits the first cryptographic result from the first client system to a second client system. The second clients system then requests that a second cryptographic function be performed in a second cryptographic logic. The second cryptograph logic may be physically secured with the second client system but be external to the second client system. The second cryptographic function is performed in the second cryptographic logic to produce a second cryptographic result. The second cryptographic result is then provided to the second client system.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method comprising:
   determining in a client system a cryptographic function to be performed, wherein the client system is a Counter Radio Controlled Improvised Explosive Device Electronic Warfare (CREW) system or Joint CREW (JCREW) system, wherein the client system is located in a military vehicle and does not have embedded cryptographic capability;
   requesting the cryptographic function be performed in a cryptographic logic, wherein the cryptographic logic is in secure communication with the client system by a secure bus which is located inside of the vehicle and not accessible by an enemy, and wherein the cryptographic logic is physically secured with the client system;
   sending data for encryption from the client system to a communication system wherein the communication system includes the cryptographic logic;
   performing the cryptographic function in the cryptographic logic to produce encrypted data;
   providing the encrypted data to the client system;
   wherein the requesting the cryptographic function comprises requesting a random number be generated and returned to the client system; and further comprising
   causing a quiet period to begin in a radio system based on the random number.

2. The method of claim 1 wherein the client system is a first client system, the cryptographic logic is a first cryptographic logic, the cryptographic function is a first cryptographic function, the encrypted data is a first cryptographic result and further comprising:
   transmitting the first cryptographic result from the first client system to a second client system;
   requesting that a second cryptographic function be performed on the first cryptographic result in a second cryptographic logic;
   performing the second cryptographic function on the first cryptographic result in the second cryptographic logic to produce a second cryptographic result; and
   providing the second cryptographic result to the second client system.

3. The method of claim 2 wherein the second cryptographic logic is physically secured with the second client system and is external to the second client system.

4. The method of claim 1 wherein the providing the encrypted data comprises:
   providing the encrypted data to the client system on an unsecure bus.

5. The method of claim 4 wherein the requesting the cryptographic function comprises:
   requesting the cryptographic function over a secured bus.

6. The method of claim 1 wherein the requesting the cryptographic function comprises:
   requesting that plain text data be encrypted.

7. The method of claim 6 wherein the requesting that plain text data be encrypted comprises:
   requesting that the plain text be encrypted using a block cypher.

8. The method of claim 1 wherein the requesting the cryptographic function comprises:
   requesting that a cryptographic hash function be performed on a block of data.

9. A system comprising:
   a client system, wherein the client system is a Counter Radio Controlled Improvised Explosive Device Electronic Warfare (CREW) system or Joint CREW (JCREW) system, wherein the client system is located in a military vehicle and does not have embedded cryptographic capability;
   a communication system, wherein the communication system is a Ground Mobile Radio (GMR) which comprises:
   a cryptographic logic, wherein the cryptographic logic is in secure communication with the client system by a secure bus which is located inside of the vehicle and not accessible by an enemy; the cryptographic logic is physically secured with the client system; the client system is configured to request that the cryptographic logic (a) perform a cryptographic function to produce cryptographic results and return the cryptographic results to the client system, and (b) generate a random number and return the number to the client system; and the cryptographic logic is configured to cause a quiet period to begin in a radio system based on the random number.

10. The system of claim 9 wherein the communication system comprises:
    a non-secure black processor configured to receive the cryptographic results and to return the cryptographic results to the client system.

11. The system of claim 10 further comprising:
    a bypass channel in the communication system with a non-secure black side, wherein the black processor is configured to return the cryptographic results through the black side of the bypass channel and then to the client system.

12. The system of claim 9 wherein the cryptographic logic comprises:
    block encryption logic configured to encrypt blocks of data.

13. The system of claim 9 wherein the cryptographic logic comprises:
    hashing logic configured to perform a hash function on a block of data.

14. The system of claim 9 wherein the client system is a first client system and further comprising:
    a transmission system, wherein the first client system is configured to have the cryptographic results transmitted to a second client system through the transmission system.

15. The system of claim 14 wherein the transmission system is a wireless transmission system.

* * * * *